United States Patent
Boehm et al.

(10) Patent No.: US 9,959,215 B2
(45) Date of Patent: May 1, 2018

(54) EFFICIENT ADDRESS-TO-SYMBOL TRANSLATION OF STACK TRACES IN SOFTWARE PROGRAMS

(71) Applicant: LinkedIn Corporation, Mountain View, CA (US)

(72) Inventors: Arman H. Boehm, Palo Alto, CA (US); Anant R. Rao, Fremont, CA (US); Jui Ting Weng, Sunnyvale, CA (US); Haricharan K. Ramachandra, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 14/964,971

(22) Filed: Dec. 10, 2015

(65) Prior Publication Data

US 2017/0168955 A1 Jun. 15, 2017

(51) Int. Cl.
G06F 9/44 (2006.01)
G06F 9/45 (2006.01)
G06F 12/1027 (2016.01)
G06F 12/0864 (2016.01)

(52) U.S. Cl.
CPC ...... *G06F 12/1027* (2013.01); *G06F 12/0864* (2013.01); *G06F 2212/452* (2013.01); *G06F 2212/608* (2013.01)

(58) Field of Classification Search
CPC ............... G06F 11/0778; G06F 11/366; G06F 11/3636; G06F 12/1027; G06F 2212/452; G06F 2212/608; G06F 11/079
See application file for complete search history.

(56) References Cited

U.S. PATENT DOCUMENTS

| 7,568,185 B1 * | 7/2009 | Shapiro | G06F 11/3466 717/130 |
| 7,877,515 B2 * | 1/2011 | Andersson | G06F 9/5088 709/203 |
| 8,316,353 B2 * | 11/2012 | Aoyama | G06F 11/0751 717/124 |

(Continued)

FOREIGN PATENT DOCUMENTS

EP 2602756 A1 6/2013

OTHER PUBLICATIONS

Chu-Pan Wong; Boosting Bug Report Oriented Fault Localization with Segmentation and Stack Trace Analysis; 2014 IEEE; pp. 181-190; <http://ieeexplore.ieee.org/stamp/stamp.jsp?arnumber=6976084>.*

(Continued)

*Primary Examiner* — Thuy Dao
*Assistant Examiner* — Cuong V Luu
(74) *Attorney, Agent, or Firm* — Park, Vaughan, Fleming & Dowler LLP; Chia-Hsin Suen

(57) ABSTRACT

The disclosed embodiments provide a system for processing data. During operation, the system obtains an attribute of a stack trace of a software program. Next, the system uses the attribute to select an address-translation instance from a set of address-translation instances for processing the stack trace. The system then provides the stack trace to the selected address-translation instance for use in translating a set of memory addresses in the stack trace into a set of symbols of instructions stored at the memory addresses.

16 Claims, 6 Drawing Sheets

(56) References Cited

U.S. PATENT DOCUMENTS

| | | | | |
|---|---|---|---|---|
| 8,863,091 B2* | 10/2014 | Dageville | ............ | G06F 11/3636 717/124 |
| 9,104,797 B1* | 8/2015 | Sekhar | .................. | G06F 11/362 |
| 9,256,517 B1* | 2/2016 | MacPherson | ......... | G06F 9/4426 |
| 9,436,533 B2* | 9/2016 | Hermany | ............ | G06F 11/0742 |
| 2003/0005414 A1* | 1/2003 | Elliott | ................. | G06F 11/0715 717/128 |
| 2004/0128658 A1* | 7/2004 | Lueh | ..................... | G06F 9/4812 717/151 |
| 2009/0106741 A1* | 4/2009 | Dageville | ............ | G06F 11/3636 717/128 |
| 2009/0292712 A1* | 11/2009 | Andersson | ............ | G06F 9/5088 |
| 2010/0095157 A1* | 4/2010 | Aoyama | ............. | G06F 11/0751 714/37 |
| 2014/0258990 A1* | 9/2014 | Klic | .................... | G06F 11/3636 717/128 |
| 2015/0347220 A1 | 12/2015 | Hermany et al. | | |

OTHER PUBLICATIONS

Adrian Nistor et al.; SUNCAT Helping Developers Understand and Predict Performance Problems in Smartphone Applications ; 2014 ACM; pp. 282-292; <https://dl.acm.org/citation.cfm?id=2610410>.*

Sunghun Kim et al.; Crash Graphs an Aggregated View of Multiple Crashes to Improve Crash Triage; 2011 IEEE; pp. 486-493; <http://ieeexplore.ieee.org/stamp/stamp.jsp?arnumber=5958261>.*

Christopher Theisen et al.; Approximating Attack Surfaces with Stack Traces; 2015 IEEE; pp. 199-208; <https://dl.acm.org/citation.cfm?id=2819039>.*

Ben Breech et al.; A Comparison of Online and Dynamic Impact Analysis Algorithms; 2005 IEEE; 10 pages; <http://ieeexplore.ieee.org/stamp/stamp.jsp?arnumber=1402123>.*

Ramesh Iliikkal; Micro architectural Anatomy of a Commercial TCP IP Stack; 2004 IEEE; pp. 37-44; <http://ieeexplore.ieee.org/stamp/stamp.jsp?arnumber=1437394>.*

"Parallelism and Partitioning in Data Warehouses", XP-002482800, Oracle9i, Data Warehousing Guide, Release 2 (9.2), Mar. 2002.

* cited by examiner

EFFICIENT ADDRESS-TO-SYMBOL TRANSLATION OF STACK TRACES IN SOFTWARE PROGRAMS

BACKGROUND

Field

The disclosed embodiments relate to stack traces for application debugging. More specifically, the disclosed embodiments relate to techniques for performing efficient address-to-symbol translation of stack traces in software programs.

Related Art

A stack trace of a software program is commonly generated in response to a crash, error, and/or other event in the software program. The stack trace may include a sequence of stack frames containing memory addresses of active subroutines at the time of the event. However, such memory addresses may not provide useful information to a developer attempting to debug or analyze the event. Instead, the memory addresses may be translated into symbols representing the instructions, such as names of methods or functions associated with the active subroutines.

During address-to-symbol translation of stack traces for a software program, a script may invoke a utility for each memory address in a stack trace of the software program. The utility may search a symbol file containing a set of mappings of memory addresses in a given build of the software program to symbols of instructions stored at the memory addresses. After locating the mapping of the memory address to a symbol in the symbol file, the utility may return the symbol, and the script may replace the memory address in the stack trace with the returned symbol. As a result, the performance of the utility and/or script may decrease as the number of stack traces and/or builds for the software program increase.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
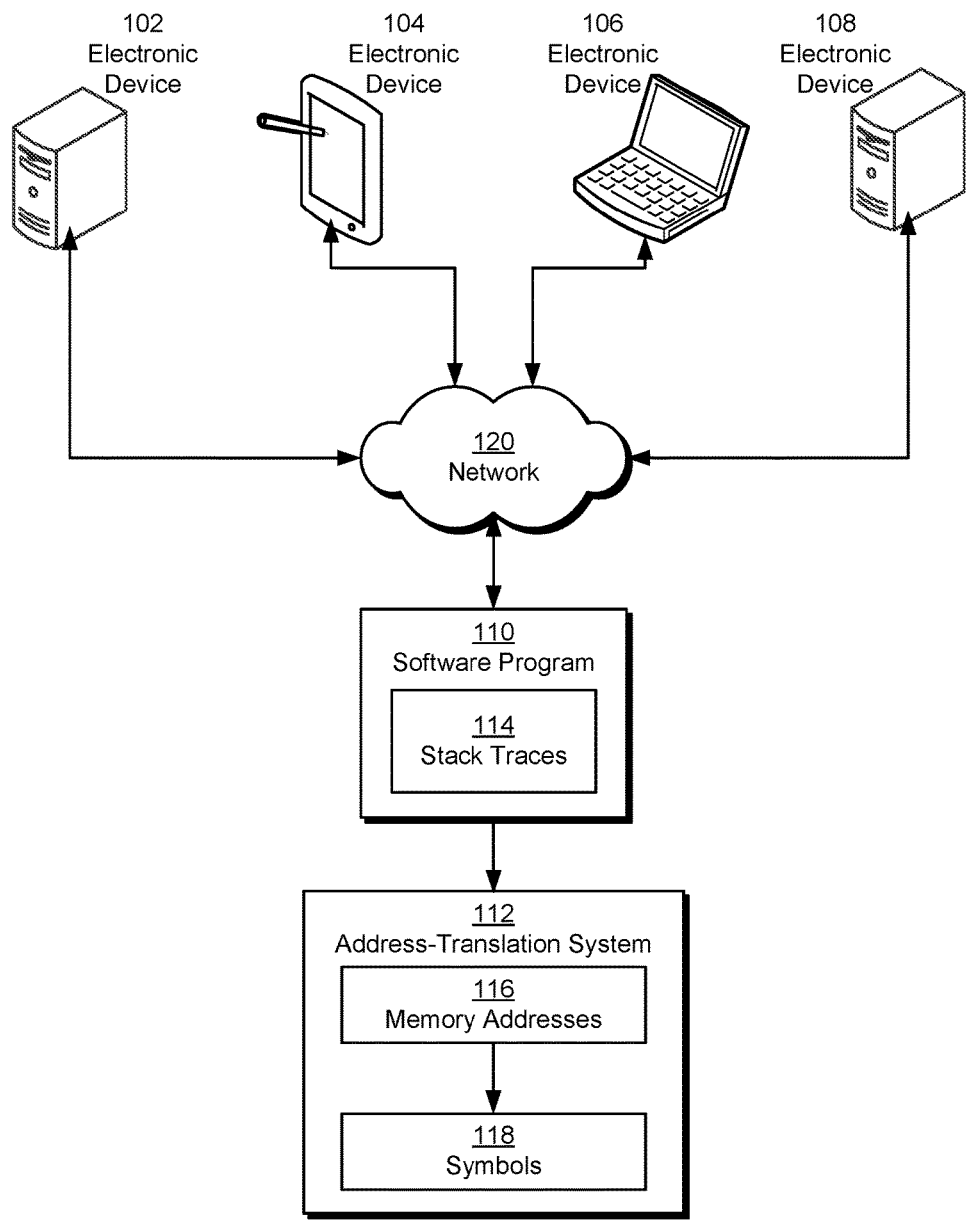
FIG. 1 shows a schematic of a system in accordance with the disclosed embodiments.

The disclosed embodiments provide a method, apparatus, and system for processing data. More specifically, the disclosed embodiments provide a method, apparatus, and system for performing efficient address-to-symbol translation of stack traces in software programs. As shown in FIG. 1, an address-translation system 112 may collect stack traces 114 of a software program 110 that executes on a number of electronic devices 102-108. For example, software program 110 may be a native application, mobile application, web application, operating system, virtual machine, database, middleware, and/or other type of software that executes using a call stack. In turn, electronic devices 102-108 may include personal computers (PCs), laptop computers, tablet computers, mobile phones, portable media players, workstations, gaming consoles, and/or other computing devices that are capable of executing software program 110 in one or more forms.

During execution of software program 110, electronic devices 102-108 may encounter errors, crashes, exceptions, and/or other events that trigger the generation of stack traces 114. For example, stack traces 114 may be included in crash reports, logged errors, and/or other records of events that occur during execution of software program 110 on the electronic devices. In turn, stack traces 114 may facilitate debugging and analysis related to the events. For example, each stack trace may contain a sequence of memory addresses 116 of subroutines that were active at the time at which an event occurred in the software program.

To facilitate a developer's understanding of stack traces 114, address-translation system 112 may translate memory addresses 116 in stack traces 114 into symbols 118 of instructions stored at the memory addresses. For example, address-translation system 112 may obtain mappings of memory addresses to function names for each build of software program 110. Address-translation system 112 may then use the mappings to replace memory addresses 116 in stack traces 114 with the function names of the corresponding instructions in software program 110. Moreover, address-translation system 112 may use a number of mechanisms to improve the speed and performance of such address-symbol translation, as described in further detail below.

Figure 2:
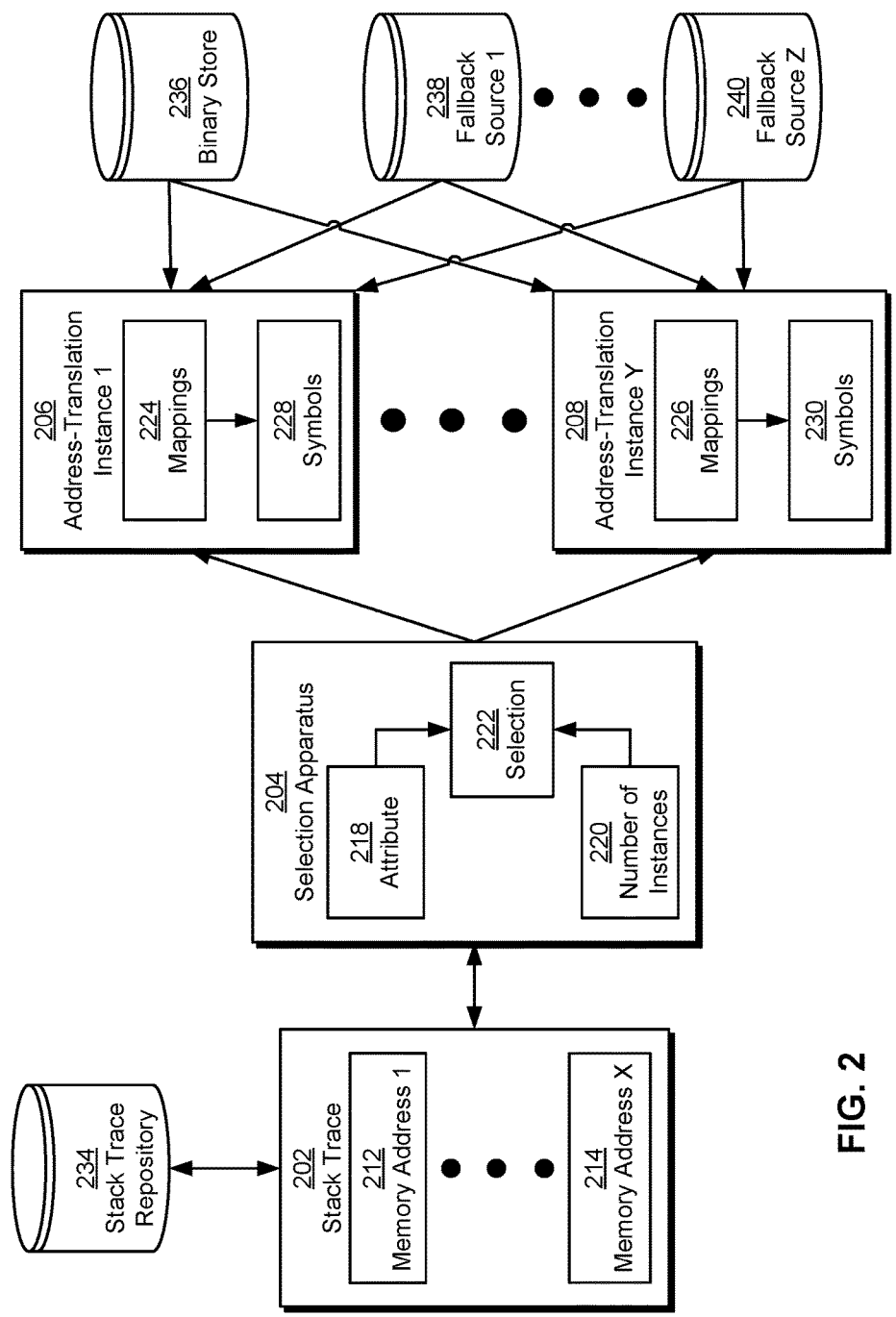
FIG. 2 shows a system for processing a stack trace of a software program in accordance with the disclosed embodiments.

FIG. 2 shows a system for processing a stack trace of a software program in accordance with the disclosed embodiments. More specifically, FIG. 2 shows an address-translation system (e.g., address-translation system 112 of FIG. 1) that replaces memory addresses (e.g., memory address 1 212, memory address x 214) in a stack trace 202 with symbols (e.g., symbols 228-230) of instructions stored at the memory addresses. The address-translation system includes a selection apparatus 204 and a number of address-translation instances (e.g., address-translation instance 1 206, address-translation instance y 208). Each of these components is described in further detail below.

Selection apparatus 204 may obtain stack trace 202 from a stack trace repository 234 such as a relational database, distributed filesystem, and/or other storage mechanism. Alternatively, selection apparatus 204 may obtain stack trace 202 from an event stream (not shown). For example, selection apparatus 204 may monitor an event stream containing records of crashes, errors, and/or other logged events in a software program (e.g., software program 110 of FIG. 1) for records containing stack traces related to the events. Each stack trace may include a series of stack frames from a call stack of the software program at the time at which an event that triggered the generation of the corresponding record occurred.

After a given stack trace (e.g., stack trace 202) is obtained by selection apparatus 204, the selection apparatus may generate a selection 222 of an address-translation instance (e.g., address-translation instance 1 206, address-translation instance y 208) for processing the stack trace. As shown in FIG. 2, selection 222 may be based on one or more attributes 218 of the stack trace and/or a number of instances 220 (e.g. number of address-translation instances) from which selection 222 can be made. More specifically, selection apparatus 204 may select address-translation instances for processing the stack traces by grouping the stack traces by attribute(s) 218. For example, attribute(s) 218 may include a unique identifier for a build of the software program, a platform of the software program, a binary name of a binary included in the build, and/or another value that can be used to partition or shard processing of stack frames across the address-translation instances.

To make selection 222, selection apparatus 204 may calculate a hash from attribute(s) 218 and number of instances 220 and use the hash to select an address-translation instance for processing the stack trace. For example, selection apparatus 204 may calculate the hash as the unique identifier for the build of the software program (e.g., a build number) modulo the number of address-translation instances. The hash may then be used as an index to identify one of the address-translation instances. Consequently, stack traces with the same build identifier may be assigned to the same address-translation instance.

After selection 222 is made for a given stack trace, the selected address-translation instance performs address-to-symbol translation of memory addresses in the stack trace. More specifically, the address-translation instance may obtain a set of mappings (e.g., mappings 224-226) of memory addresses in the software program to symbols (e.g., symbols 228-230) of the corresponding instructions in the software program and use the mappings to replace each memory address in the stack trace with the symbol to which the memory address is mapped. For example, the address-translation instance may obtain a symbol file containing mappings of memory addresses in a specific binary or build of the software program to symbols representing function names in the binary or build. Because the symbols contain human-readable data, such address-to-symbol translation may improve understanding and analysis of the stack trace by a developer and/or another user.

As shown in FIG. 2, the address-translation instances may obtain the mappings from a number of sources, including a binary store 236 and one or more fallback sources (e.g., fallback source 1 238, fallback source z 240). Moreover, the order in which the address-translation instances search the sources for the mappings may reflect the likelihood that each source contains a set of mappings for a given build. For example, each address-translation instance may search the sources for the mappings in decreasing order of likelihood of containing the mappings.

Binary store 236 may include binary versions of the software program, as well as mappings of memory addresses in each version to symbols of instructions stored at the memory addresses. For example, the binary store may include different builds of the software program, as well as symbol files containing mappings of memory addresses in the builds to symbols of instructions stored at the memory addresses. Each symbol file may be automatically generated during compilation of a binary file in the corresponding build. In turn, the symbol file may be uploaded to binary store 236 with and/or as a part of the build.

Because binary store 236 is presumed to contain symbol files for all builds of the software program, binary store 236 may represent a primary source of symbol files containing mappings of memory addresses to symbols for the software program. As a result, an address-translation instance may attempt to locate a set of mappings for a specific build in binary store 236 before searching the fallback sources for the mappings. For example, the address-translation instance may match a build number and/or other attribute 218 of a stack trace to a location of the set of mappings in binary store 236, such as a folder with a name that matches attribute 218. When the folder and/or a symbol file containing the set of mappings is not present in binary store 236, the address-translation instance may obtain the symbol file from a fallback source, such as a database containing custom builds of the software program and/or an archive database.

After obtaining a symbol file containing mappings of memory addresses to symbols for a given build, an address-translation instance may use the symbol file to replace the memory addresses in each stack trace of the build with the symbols to which the memory addresses are mapped. As a given mapping is retrieved from the symbol file, the address-translation instance may cache the mapping in memory and use the cached mapping to replace the same memory address in subsequent stack traces of the build with the symbol. By reading the mapping from memory instead of from the symbol file, the address-translation instance may increase the rate at which the memory addresses in the subsequent stack traces are translated into the symbols.

To further improve performance associated with address-to-symbol translation of stack traces from stack trace repository 234, each address-translation instance may process, in parallel, a number of stack traces for which the address-translation instance is selected. As discussed in further detail below with respect to FIG. 3, each address-translation instance may create a different thread to process stack traces for each binary and/or use a separate instance of a utility to translate the memory addresses into the symbols for each build.

By sharding processing of stack traces across multiple address-translation instances that handle discrete, non-overlapping subsets of stack traces, the system of FIG. 2 may provide efficient scaling of address-to-symbol translation of the stack traces. Additional performance improvements may be obtained by caching the mappings and parallelizing address-to-symbol translation at the address-translation instances, as described below.

Those skilled in the art will appreciate that the system of FIG. 2 may be implemented in a variety of ways. In particular, data repository 234, binary store 236, fallback sources, selection apparatus 204, and the address-translation instances may be provided by a single physical machine, multiple computer systems, one or more virtual machines, a grid, one or more databases, one or more filesystems, and/or a cloud computing system. Selection apparatus 204 and the address-translation instances may additionally be implemented together and/or separately by one or more hardware and/or software components and/or layers. For example, the address-translation instances may execute within separate applications, processes, virtual machines, and/or physical machines.

Figure 3:
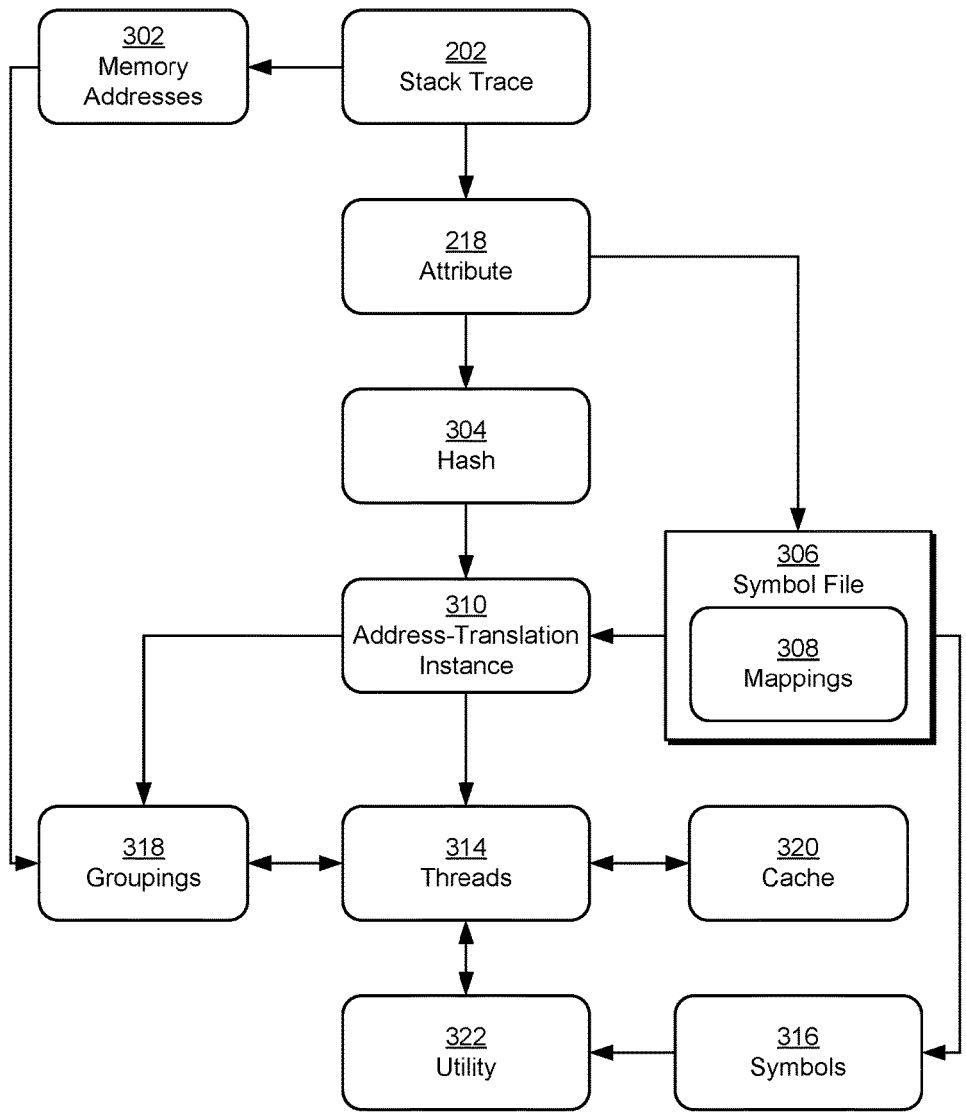
FIG. 3 shows an exemplary processing of a stack trace in accordance with the disclosed embodiments.

FIG. 3 shows an exemplary processing of stack trace 202 in accordance with the disclosed embodiments. As mentioned above, stack trace 202 may include memory addresses 302 of instructions that were executed prior to an event in a software program, such as a crash, exception, and/or error. For example, the stack trace may include stack frames in a call stack of the software program at the time at which the event occurred, with each stack frame containing a position of the stack frame in the call set, an address of the corresponding instruction, and a binary name of the binary to which the instruction belongs. In other words, stack trace 202 may include information that can be used to debug and/or analyze the event.

Stack trace 202 may also include attribute 218, which is used to select an address-translation instance 310 for processing stack trace 202. Attribute 218 may identify a build of the software program, a name of the software program, a binary used in the software program, a platform of the software program, and/or another value that can be used to shard processing of stack traces across multiple address-translation instances. Moreover, attribute 218 may be selected so that the address-translation instances perform address-to-symbol translation of discrete, non-overlapping sets of stack frames in the stack traces. For example, attribute 218 may include the build and platform of the software program from which stack trace 202 was obtained to enable processing of stack trace 202 and other stack traces from the same build and platform by the same address-translation instance 310.

To select address-translation instance 310 based on attribute 218, a hash 304 may be calculated from attribute 218 and used as an index for selecting the address-translation instance. For example, a numeric representation of attribute 218 may be divided by the number of address-translation instances, and the remainder of the division may be matched to a numeric identifier for address-translation instance 310.

After address-translation instance 310 is selected for use in processing stack trace 202, address-translation instance 310 may obtain a symbol file 306 containing mappings 308 of some or all memory addresses 302 in stack trace 202 to symbols 316 of instructions stored at the memory addresses. For example, address-translation instance 310 may match attribute 218 to a location of symbol file 306 in a binary store (e.g., binary store 236 of FIG. 2), such as a directory name in the binary store. If symbol file 306 is not present in the binary store, address-translation instance 310 may obtain symbol file 306 from a fallback source such as a custom build repository and/or an archive repository. Address-translation instance 310 may then store symbol file 306 and/or other symbol files associated with attribute 218 and/or stack trace 202 in a local filesystem for subsequent retrieval and use.

Next, address-translation instance 310 may generate a set of groupings 318 of memory addresses 302 and use a number of threads 314 to process groupings 318. For example, the address-translation instance may group the memory addresses by binary name and use a separate thread to replace a subset of memory addresses 302 for each binary name with a subset of symbols 316 of instructions stored at the subset of memory addresses. As a result, address-translation instance 310 may parallelize processing of stack traces and/or groupings 318 of memory addresses in the stack traces, which may allow memory addresses in the stack traces to be translated into symbols more quickly than if stack frames in the stack traces were processed sequentially.

During processing of groupings 318, threads 314 may initially check an in-memory cache 320 for mappings 308 associated with the groupings. For example, each thread may use a binary name, build number, and memory address in stack trace 202 as a key to a mapping in cache 320. If the mapping is found in cache 320, the thread may replace the memory address in stack trace 202 with the symbol to which the memory address is mapped from cache 320.

If a thread cannot find a given mapping associated with a given memory address in cache 320, the thread may invoke a utility 322 to retrieve the mapping from a symbol file for the binary name and build number, such as symbol file 306. For example, the thread may pass a path to the symbol file and the memory address to the utility, and the utility may return the symbol to which the memory address is mapped in the symbol file. The thread may replace the memory address in stack trace 202 with the symbol and store the mapping in cache 320 so that address-to-symbol translation of subsequent stack frames associated with the same memory address, build number, and binary name can be performed without reinvoking the utility. Because such subsequent stack frames may share the same attribute 218, the subsequent stack frames may also be directed to address-translation instance 310, thus increasing the use of cache 320 in processing the subsequent stack frames and decreasing lookup of mappings in symbol files by utility 322.

To further improve retrieval of symbols 316 from symbol file 306 and/or other symbol files by utility 322, each thread may maintain a running instance of the utility for each binary or symbol file containing mappings 308 for which the thread is responsible. In turn, the running instance may return the symbols in the mappings more quickly than if utility 322 were invoked and terminated every time the thread required a lookup of a symbol from the symbol file.

Figure 4:
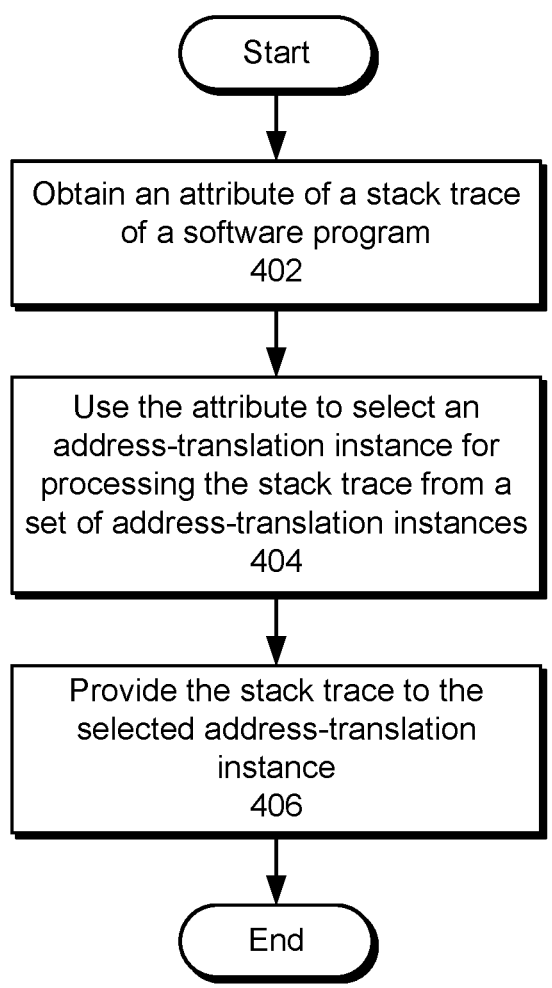
FIG. 4 shows a flowchart illustrating the processing of a stack trace of a software program in accordance with the disclosed embodiments.

FIG. 4 shows a flowchart illustrating the processing of a stack trace of a software program in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, an attribute of a stack trace of a software program is obtained (operation 402). The attribute may include an identifier for a build of the software program, a platform of the software program, a name of the software program, an error type, and/or another characteristic of the execution environment from which the stack trace was obtained.

Next, the attribute is used to select an address-translation instance for processing the stack trace from a set of address-translation instances (operation 404). For example, a hash may be calculated from the attribute and used as an index to a specific address-translation instance. The hash and/or number of address-translation instances may be adjusted to scale processing by the address-translation instances to the number of stack traces and/or builds of the software program. The stack trace is then provided to the selected address-translation instance (operation 406) for use in translating a set of memory addresses in the stack trace into a set of symbols of instructions stored at the memory addresses, as described in further detail below with respect to FIG. 5.

Figure 5:
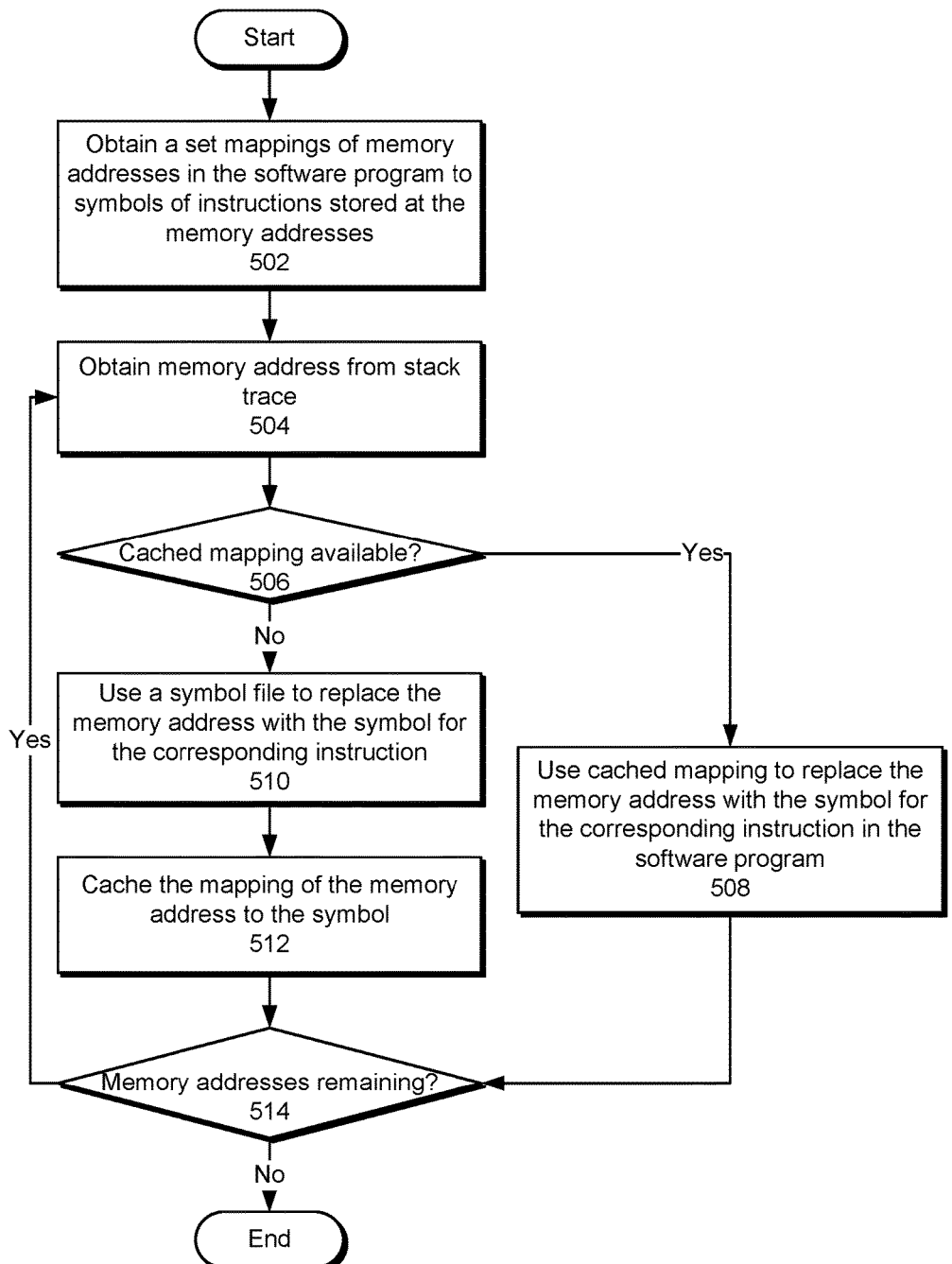
FIG. 5 shows a flowchart illustrating the processing of a stack trace by an address-translation instance in accordance with the disclosed embodiments.

FIG. 5 shows a flowchart illustrating the processing of a stack trace by an address-translation instance in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a set of mappings of memory addresses in a software program to symbols of instructions stored at the memory addresses is obtained (operation 502). The mappings may be included in a symbol file that is generated with a build of the software program. For example, the symbol file may map memory addresses of one or more binaries in the software program to function names of functions stored at the memory addresses. The symbol file may be obtained by matching an attribute of the stack trace (e.g., a build number) to a location of the set of mappings in a binary store (e.g., a directory in the binary store with a name that matches the build number) and retrieving the symbol file from the location. When the symbol file is not present in the binary store, the mappings may be obtained from a fallback source such as a custom build repository and/or an archive repository.

Next, a memory address is obtained from the stack trace (operation 504). For example, the memory address may be included in a stack frame of the stack trace, along with a position of the stack frame in the stack trace and a binary name of a binary to which the instruction stored at the memory address belongs. The memory address may then be processed based on the availability of a cached mapping (operation 506) of the memory address to a symbol of the instruction. If the cached mapping is available, the cached mapping is used to replace the memory address with the symbol (operation 508). For example, the memory address, a binary name, and a build number associated with the stack trace may be used as a key to the cached mapping, and the key may be used to retrieve the symbol from the cached mapping.

If the cached mapping is not available, a symbol file is used to replace the memory address with the symbol for the corresponding instruction (operation 510), and the mapping of the memory address to the symbol is cached (operation 512). For example, a utility may be invoked with a path to the symbol file and the memory address, and the symbol may be obtained in response to the invocation. The memory address, binary name, and build number associated with the stack trace may then be mapped to the symbol in memory for subsequent use by the address-translation instance.

The address-translation instance may perform address-to-symbol translation for remaining memory addresses (operation 514) in the stack trace. Each memory address in the stack trace is obtained (operation 504) and replaced with a symbol from a cached mapping of the memory address to a symbol (operations 506-508), or from a symbol file containing a mapping of the memory address to the symbol (operation 510). Once the mapping is obtained from the symbol file, the mapping may be cached (operation 512) to expedite subsequent translation of the memory address into the symbol. The address-translation instance may further improve processing of the stack trace and other stack traces by processing groupings of memory addresses in the stack traces in parallel, as discussed above.

Figure 6:
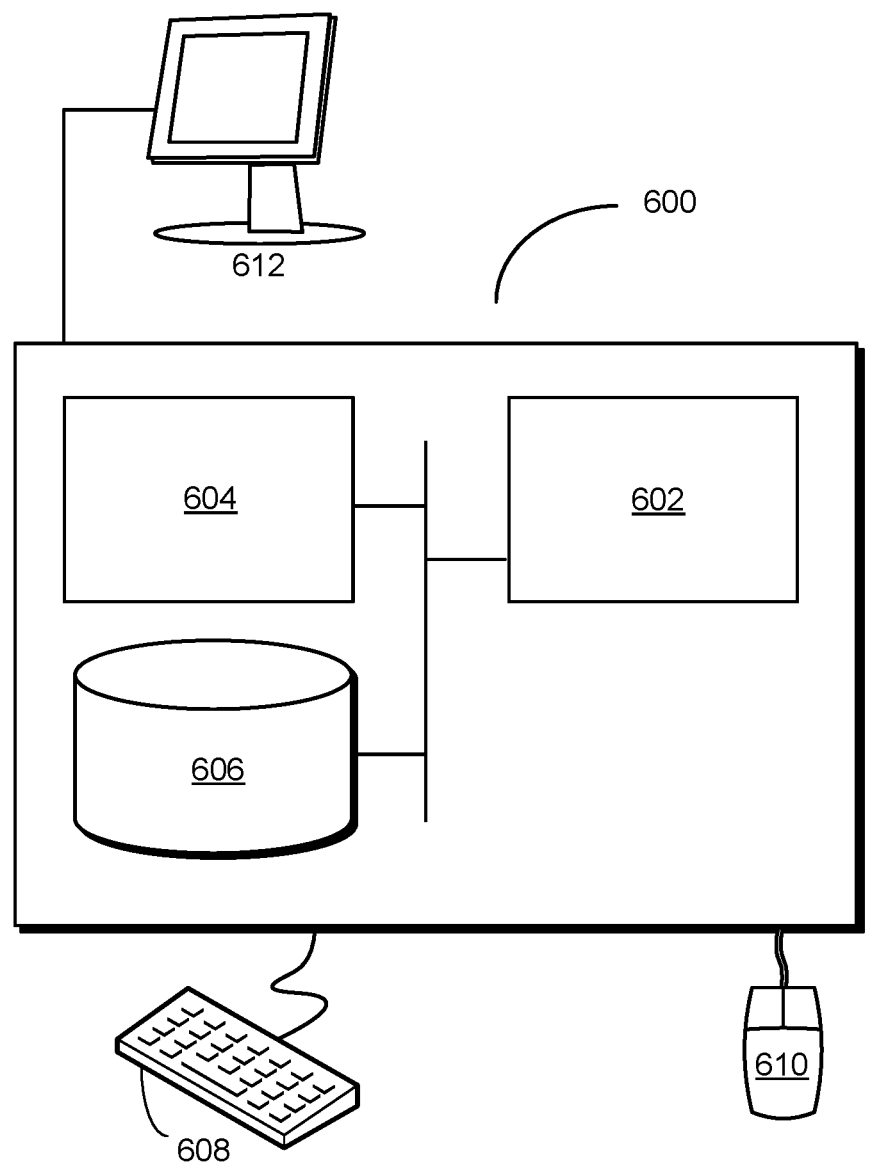
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for performing efficient address-to-symbol translation for application stack traces. The system may include a selection apparatus that obtains an attribute of a stack trace of a software program and uses the attribute to select an address-translation instance from a set of address-translation instances for processing the stack trace. Next, the selection apparatus provides the stack trace to the selected address-translation instance for use in translating a set of memory addresses in the stack trace into a set of symbols of instructions stored at the memory addresses.

The system may also include the selected address-translation instance. The address-translation instance may obtain one or more symbol files containing a set of mappings of the memory addresses in the software program to the symbols of the instructions stored at the memory addresses. Next, the address-translation instance may use the set of mappings to replace the memory addresses in the stack trace with the symbols. After a given mapping is retrieved from a symbol file, the address-translation instance may cache the mapping and use the cached mapping to replace the memory address with the symbol in a subsequent stack trace of the software program. The address-translation instance may further process one or more stack traces in parallel with the stack trace.

In addition, one or more components of computer system 600 may be remotely located and connected to the other components over a network. Portions of the present embodiments (e.g., selection apparatus, address-translation instances, stack trace repository, binary store, fallback sources, etc.) may also be located on different nodes of a distributed system that implements the embodiments. For example, the present embodiments may be implemented using a cloud computing system that performs address-to-symbol translation of stack traces from a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   obtaining an attribute of a stack trace of a software program;
   using the attribute to select, by a computer system, an address-translation instance from a set of address-translation instances for processing the stack trace; and
   providing the stack trace to the selected address-translation instance for use in translating a set of memory addresses in the stack trace into a set of symbols of instructions stored at the memory addresses, wherein translating the set of memory addresses comprises processing, by the selected address-translation instance, the stack trace by:
      obtaining one or more symbol files, each symbol file comprising a set of mappings of the memory addresses in the software program to the symbols of the instructions stored at the memory addresses;
      using the sets of mappings from the one or more symbol files to replace the memory addresses in the stack trace with the symbols; and
      caching, in a memory associated with the selected address-translation instance, for at least one of the memory addresses that was replaced, a mapping of the memory address to a symbol of a corresponding instruction, the caching comprising associating the memory address and stack trace information with the symbol stored in the cached mapping; and
   using the cached mapping to replace the memory address with the symbol in a subsequent stack trace of the software program.

2. The method of claim 1, wherein using the cached mapping to replace the memory address in the subsequent stack trace with the symbol comprises:
   matching the memory address and stack trace information comprising a binary name and a build number to the symbol in the cached mapping.

3. The method of claim 1, further comprising:
   processing, by the selected address-translation instance, one or more additional stack traces in parallel with the stack trace.

4. The method of claim 3, wherein processing the one or more additional stack traces in parallel with the stack trace comprises:
   using a separate instance of a utility for translating the memory addresses into the symbols for each symbol file comprising the set of mappings of the memory addresses to the symbols.

5. The method of claim 3, wherein processing the one or more additional stack traces in parallel with the stack trace comprises:
   using a separate thread to replace a subset of the memory addresses from a binary in the software program with a subset of the symbols of the corresponding instructions stored at the subset of the memory addresses.

6. The method of claim 1, wherein obtaining the set of mappings of the memory addresses to the symbols comprises:
   matching the attribute to a location of the set of mappings in a binary store; and
   when the set of mappings is not present in the binary store, obtaining the set of mappings from a fallback source.

7. The method of claim 1, wherein using the attribute to select the address-translation instance from the set of address-translation instances for processing the stack trace comprises:
   calculating a hash from the attribute; and
   using the hash to select the address-translation instance for processing the stack trace.

8. The method of claim 1, wherein the attribute comprises an identifier for a build of the software program.

9. An apparatus, comprising:
   one or more processors; and
   memory storing instructions that, when executed by the one or more processors, cause the apparatus to:
      obtain an attribute of a stack trace of a software program;
      use the attribute to select an address-translation instance from a set of address-translation instances for processing the stack trace; and
      provide the stack trace to the selected address-translation instance for use in translating a set of memory addresses in the stack trace into a set of symbols of instructions stored at the memory addresses, wherein translating the set of memory addresses comprises processing, by the selected address-translation instance, the stack trace by:
         obtaining one or more symbol files, each symbol file comprising a set of mappings of the memory addresses in the software program to the symbols of the instructions stored at the memory addresses;
         using the sets of mappings from the one or more symbol files to replace the memory addresses in the stack trace with the symbols; and
         caching, in a memory associated with the selected address-translation instance, for at least one of the memory addresses that was replaced, a mapping of the memory address to a symbol of a corresponding instruction, the caching comprising associating the memory address and stack trace information with the symbol stored in the cached mapping; and
      using the cached mapping to replace the memory address with the symbol in a subsequent stack trace of the software program.

10. The apparatus of claim 9, wherein using the cached mapping to replace the memory address in the subsequent stack trace with the symbol comprises:
    matching the memory address and stack trace information comprising a binary name and a build number to the symbol in the cached mapping.

11. The apparatus of claim 9, wherein the memory further stores instructions that, when executed by the one or more processors, cause the apparatus to perform on the selected address-translation instance:
    processing one or more additional stack traces in parallel with the stack trace.

12. The apparatus of claim 11, wherein processing the one or more additional stack traces in parallel with the stack trace comprises:
    using a separate instance of a utility for translating the memory addresses into the symbols for each symbol file comprising the set of mappings of the memory addresses to the symbols.

13. The apparatus of claim 11, wherein processing the one or more additional stack traces in parallel with the stack trace comprises:

using a separate thread to replace a subset of the memory addresses from a binary in the software program with a subset of the symbols of the corresponding instructions stored at the subset of the memory addresses.

14. The apparatus of claim 9, wherein obtaining the set of mappings of the memory addresses to the symbols comprises:
matching the attribute to a location of the set of mappings in a binary store; and
when the set of mappings is not present in the binary store, obtaining the mapping from a fallback source.

15. The apparatus of claim 9, wherein using the attribute to select the address-translation instance from the set of address-translation instances for processing the stack trace comprises:
calculating a hash from the attribute; and
using the hash to select the address-translation instance for processing the stack trace.

16. A system, comprising:
a selection module comprising a non-transitory computer-readable medium comprising instructions that, when executed by one or more processors, cause the system to:
obtain an attribute of a stack trace of a software program;
use the attribute to select an address-translation instance from a set of address-translation instances for processing the stack trace; and
provide the stack trace to the selected address-translation instance for use in translating a set of memory addresses in the stack trace into a set of symbols of instructions stored at the memory addresses; and
the selected address translation instance comprising a non-transitory computer-readable medium comprising instructions that, when executed by one or more processors, cause the system to:
obtain one or more symbol files, each symbol file comprising a set of mappings of the memory addresses in the software program to the symbols of the instructions stored at the memory addresses;
use the sets of mappings from the one or more symbol files to replace the memory addresses in the stack trace with the symbols; and
cache, in a memory associated with the selected address-translation instance, for at least one of the memory addresses that was replaced, a mapping of the memory address to a symbol of a corresponding instruction, the caching comprising associating the memory address and stack trace information with the symbol stored in the cached mapping; and
use the cached mapping to replace the memory address with the symbol in a subsequent stack trace of the software program.

\* \* \* \* \*